(12) United States Patent
Hamamura et al.

(10) Patent No.: US 6,700,617 B1
(45) Date of Patent: Mar. 2, 2004

(54) IMAGE TAKING APPARATUS WITH OPERATIONAL IMAGE PICK-UP UNIT

(75) Inventors: Toshihiro Hamamura, Osaka (JP); Hiroaki Kubo, Mukou (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/383,182

(22) Filed: Aug. 25, 1999

(30) Foreign Application Priority Data

Sep. 2, 1998 (JP) ............................................. 10-248793
Sep. 25, 1998 (JP) ............................................. 10-272000

(51) Int. Cl.$^7$ ......................... H04N 5/225; H04N 5/232
(52) U.S. Cl. ..................... 348/351; 348/340; 348/357; 348/374; 396/358
(58) Field of Search .......................... 348/64, 335, 342, 348/340, 344, 345, 351, 357, 369, 374; 396/118, 119, 269, 270, 354, 357, 358; H04N 5/225, 5/232

(56) References Cited

U.S. PATENT DOCUMENTS

| 4,757,387 A | * | 7/1988 | Saito | 348/342 |
| 4,855,837 A | | 8/1989 | Tanimoto | 348/375 |
| 5,115,308 A | * | 5/1992 | Onuki | 348/344 |
| 5,453,784 A | * | 9/1995 | Krishnan et al. | 348/348 |
| 5,483,284 A | * | 1/1996 | Ishiguro | 348/335 |
| 6,072,529 A | * | 6/2000 | Mutze | 348/351 |
| 6,426,777 B1 | * | 7/2002 | Sato | 348/373 |

FOREIGN PATENT DOCUMENTS

| JP | 7-1841000 | 7/1995 | .......... H04N/5/225 |

* cited by examiner

Primary Examiner—Ngoc-Yen Vu
(74) Attorney, Agent, or Firm—Sidley Austin Brown & Wood LLP (57) ABSTRACT

An image taking apparatus is provided with an image taking lens, a mirror which is capable of pivotally changing a position thereof between a first position where the mirror is disposed on an optical path of the image taking lens and a second position where the mirror is disposed off the optical path, and an image pick-up unit for picking up an optical image from the image taking lens. In accordance with the pivotal movement of the mirror, a driver moves the image pick-up unit along the optical direction of the image taking lens.

10 Claims, 6 Drawing Sheets

IMAGE TAKING APPARATUS WITH OPERATIONAL IMAGE PICK-UP UNIT

The present invention claims priorities of Japanese Patent Applications Serial Nos. H10-248793 and H10-272000, the contents of which is incorporated hereinto by reference in its entirety.

BACKGROUND OF THE INVENTION

1. Field of the Invention

This invention relates to an image taking apparatus such as a digital camera.

2. Description of the Related Art

Figure 8:
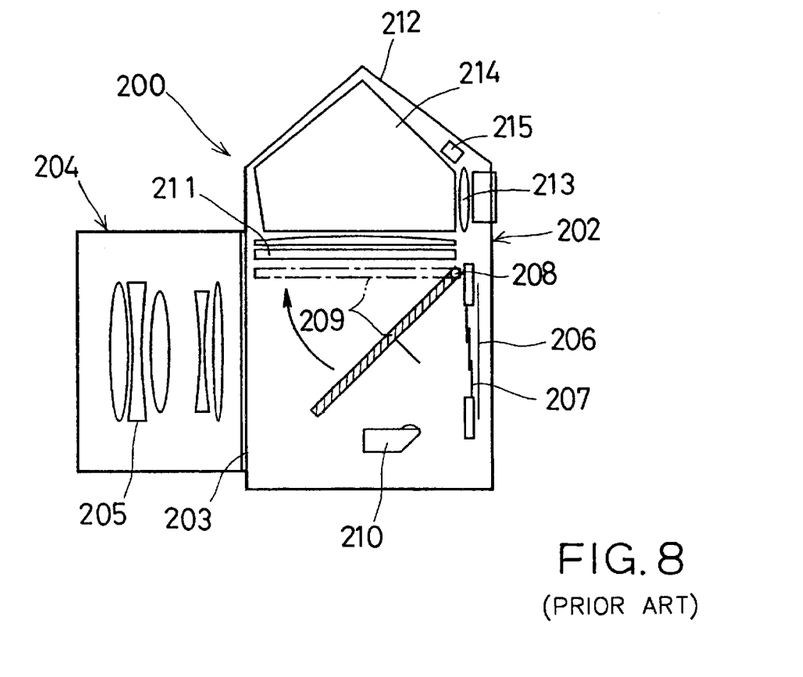
FIG. 8 is a schematic cross-sectional side view of a conventional silver-halide single-lens reflex camera.
Figure 9:
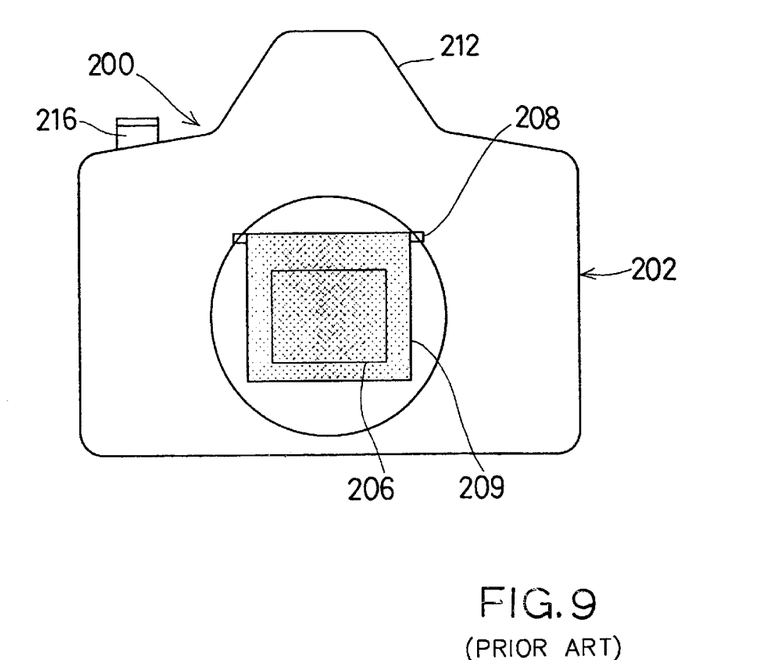
FIG. 9 is a schematic front view of the conventional silver-halide single-lens reflex camera.

As a silver-halide camera, a single-lense reflex camera equipped with an interchangeable photographing lens is known. As shown in FIGS. 8 and 9, the silver-halide single-lense reflex camera is comprised of a box-shape camera main body 202 and a photographing lens 204 interchangeably attached to a front surface of the camera main body 202 via a mounting portion 203.

In the camera main body 202, a film 206 is installed at a rear portion of the main camera body 202 so as to be positioned on a focal point of the lens unit 205 of the photographing lens 204. A focal plane shutter 207 is provided in close proximity to the front of the film 206. In front of the focal plane shutter 207, a quick return mirror 209 is provided. The quick return mirror is pivoted by a pivot shaft 208 to change the position between an up-position and a down-position. Also provided in the camera main body 202 is an AF (Automatic Focussing) sensor 210 for receiving an optical image of an object passed through the lens unit 205 to detect the focussing status of the optical image formed on an image focussing surface of the film 206.

Above the quick return mirror 209, a focussing screen 211 for reproducing the focussed image formed on the image focussing surface of the film 206 is provided so as to be located in a plane equivalent to the image focussing surface. Provided on the camera main body 202 is a penta-finder 212 including a penta-prism 214 for reflexing the optical image of the object focussed on the focussing screen 211 to a rear ocular 213. Furthermore, a light sensor 215 for measuring the luminance of the object is equipped in the finder 212.

In the silver-halide single-lense reflex camera, as illustrated by the actual line in FIG. 8, the quick return mirror 209 is normally positioned such that the pivotal end (i.e., upper end) of the mirror 209 is positioned near the upper portion of the film 206 and the opposite end (i.e., lower end) thereof is located near the photographing lens 204 so as to be inclined by 45 degrees to the light axis. Depressing the shutter button 216 causes the quick return mirror 209 to rotate about the pivot shaft 208 in the direction of the arrow to the horizontal position indicated by the imaginary line in FIG. 8. Then, the focal plane shutter 207 opens, which in turn causes the object image confirmed through the finder 212 to be focussed onto and recorded by the film 206.

In the meantime, with the progress of the semiconductor technology, a digital camera in which an image pick up element such as a CCD (Charged Coupled Device) is used in place of the film 206, has been spreading recently. In such a digital camera, the image pick up element photoelectrically converts an optical image of an object into electric signals, which are then subjected to image processing to generate image data. The image data is recorded in a recording medium, such as a memory card, or is reproduced on a display of a camera main body or a personal computer.

While the use of digital cameras have spread widely, it has been proposed to make the maximum use of the resources of a silver halide camera. In other words, a digital camera utilizing a camera main body 202 and a photographing lens 204 of a silver-halide single-lens reflex camera, has been proposed. In such a digital camera, an image pick up element, such as a CCD, is generally provided at a film position (lens back position) to receive an optical image of an object focussed by the photographing lens 204 when the quick return mirror 209 is upwardly moved by fully depressing the shutter button 204.

The light receiving surface of the image pick up element in such a digital camera is generally covered by a protection glass layer. In addition, the pixels constituting the image pick up element are regularly arranged. Therefore, if the image pick up element is utilized as it is, influences of return noises cannot be avoided. To prevent such noises, an optical low pass filter is generally disposed on the front surface of the image pick up element.

Since for a silver-halide single-lens reflex camera the thickness of the film 206 is several tens microns, a required depth from the image focussing surface for installing the film 206 is slightly larger than several tens microns. Accordingly, a silver-halide single-lens reflex camera is designed to have such a depth.

In a digital camera, the image pick up element and the optical low pass filter are large in thickness. Especially, the optical low pass filter is relatively thick. Therefore, it is very hard to install the optical low pass filter in a narrow limited space between the image pick up element and the quick return mirror 209.

So long as the camera main body of the silver-halide single-lens reflex camera is utilized, it is impossible to change the distance from the mounting portion 203 to the image focussing surface. Furthermore, the location of the quick return mirror 209 cannot be changed because the focussing status on the image focussing surface should be reproduced on the focussing screen 211.

Therefore, if an image pick-up unit including the image pick up element and the optical low pass filter is positioned on an appropriate portion, a mechanical interference may occur between the quick return mirror 209 and the image pick-up unit. Such a mechanical interference may cause a damage of the quick return mirror 209 or a shift of the image pick up element which in turn causes an out-of-focus.

The focal plane shutter 207 can be removed because the image pick up element itself has a function for controlling the exposure start and terminate timing (electronic shutter function). However, removing the quick return mirror 209 causes a big mechanical change, which eliminates the effective use of the resources of a silver halide single-lens reflex camera.

To avoid the mechanical interference as mentioned above, it has been proposed to utilize a thin optical low pass filter. However, thinning the filter causes a deterioration of the filtering function, which in turn deteriorates the quality of the image to be obtained.

Another proposal for solving the above mentioned problems is to dispose an optical low pass filter around the lens mounting portion 203 in front of the quick return mirror 209. However, this will arise such a problem that some photographing lenses cannot be used because rear lenses thereof comes into contact with the optical low pass filter.

Furthermore, an infrared cutting filter is sometimes mounted in front of the image pick up element to solve the luminosity difference between the image pick up element and the human's eyes. In this case, however, the similar problems as in the optical low pass filter will also arise.

SUMMARY OF THE INVENTION

Therefore, it is an object of the present invention to provide an image taking apparatus which can prevent a mechanical interference between an image pick up unit for picking up an optical image passed through an image taking lens and a mirror which is capable of changing a position thereof between, one being on an optical path of the image taking lens and the other being off the optical path.

It is another object of the present invention to provide an image taking apparatus which can effectively prevent a damage of the mirror and an occurrence of out-of-focus, and allow a wide selection of an image taking lens.

According to one aspect of the present invention, an image taking apparatus includes an image taking lens, a mirror which is capable of a pivotal movement such that the mirror changes a position thereof between a first position where the mirror is disposed on an optical path of the image taking lens and a second position where the mirror is disposed off the optical path, an image pick-up unit for picking up an optical image focussed by the image taking lens, and a driver for moving the image pick-up unit along a direction of an optical axis of the image taking lens in accordance with the pivotal movement of the mirror.

With this image taking apparatus, the image pick-up unit moves so as to avoid a mechanical interference with the mirror. For example, the image pick-up unit advances to an image pick-up position when the mirror rotates to an image taking position when taking an image, and returns to a standby position when the mirror returns to an original position after taking an image.

It is still another object of the present invention to provide an image taking apparatus which comprises an image taking lens, a mirror for changing a direction of an optical bundle introduced from the image taking lens by pivoting the mirror about a pivot axis member and an image pick-up unit for picking up an optical image taken by the image taking lens. The mirror is provided with a space for avoiding a mechanical interference with the image pick-up unit.

It is still another object of the present invention to provide an image taking apparatus which comprises an image taking lens, a mirror for changing a direction of an optical bundle from the image taking lens by pivoting about a pivot axis member and an image pick-up unit for picking up an optical image taken by the image taking lens. The image pick-up unit is disposed so as to be shifted to an optical axis of the image taking lens.

A mechanical interference between the mirror and the image pick-up unit can be avoided by forming a space of the mirror or shifting the image pick-up unit against the optical axis of the image taking lens.

BRIEF DESCRIPTION OF THE DRAWINGS

The above and other objects, features, and advantages of the present invention will be apparent from the following detailed description of the preferred embodiments with reference to the attached drawings, wherein.

DETAILED DESCRIPTION OF THE PREFERRED EMBODIMENTS

Figure 1:
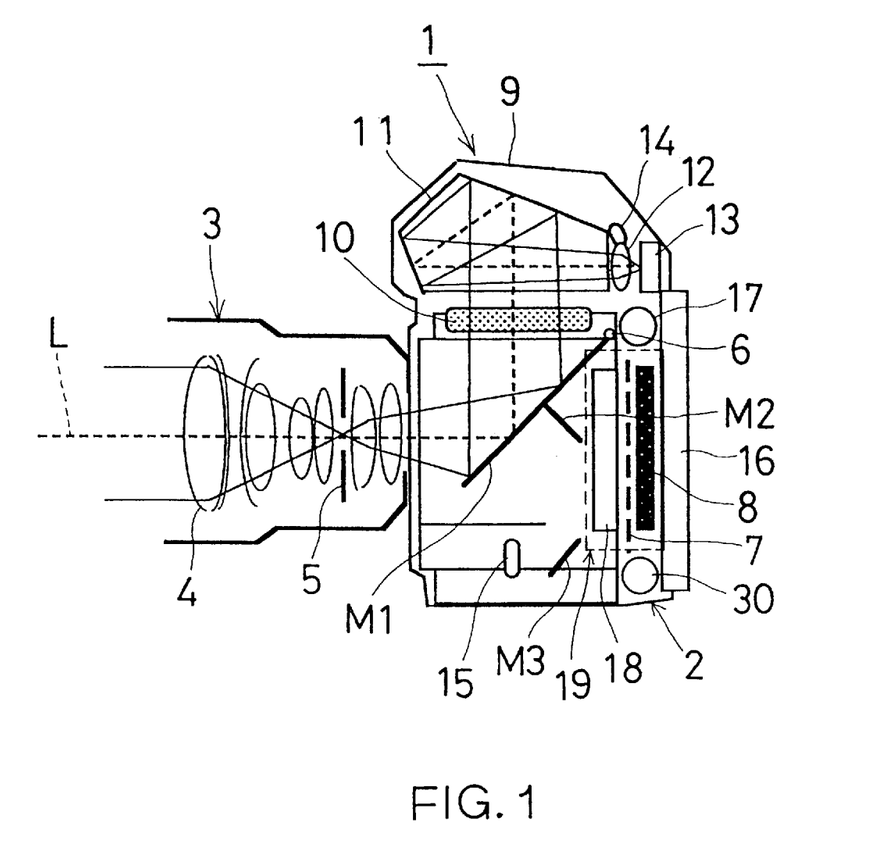
FIG. 1 is a schematic cross-sectional view of a main mechanical portion of a digital camera according to a first embodiment of the present invention.

FIG. 1 is a schematic cross-sectional view of a main mechanical portion of a digital camera according to a first embodiment of the present invention, and FIGS. 2A to 2D illustrate an operation of the main mechanical portion of the digital camera when taking an image.

The digital camera 1 is comprised of a camera main body 2 which has basically the same structure as in a camera main body of a conventional silver halide single-lense reflex camera and an image taking lens 3 attached in front of the camera main body 2. The image taking lens 3 is equipped with a lens unit 4 and a diaphragm 5. Behind the lens unit 4 along the optical path, a quick return mirror M1 is provided. The mirror M1 is pivoted at a pivoting portion 6 provided at a rear upper portion in the camera main body 2. Provided behind the quick return mirror M1 along the optical path are a focal plane shutter 7 and an image pick-up sensor 8.

In this embodiment, the focal plane shutter 7 remains in the camera main body 2, however, the shutter 7 may be removed because the image pick-up sensor 8 can function as an electronic shutter.

In front of the image pick-up sensor 8, an optical low pass filer 18 is disposed for preventing an occurrence of false image due to the light having frequency components smaller than the pixel pitch of the image pick-up sensor 8. Thus, the optical low pass filter 18, the focal plane shutter 7 and the image pick-up sensor 8 constitute an image pick-up unit 19. Depending on the spectral luminous efficiency of the image pick-up sensor 8, an infrared cutting filter may be positioned in front of the optical low pass filter 18.

The image pick-up unit 19 is designed so as to be moved by a driver 30 forward and backward in the direction of the optical axis. The image pick-up unit 19 moves forward in the direction of the optical axis to an image pick-up position, i.e., to a position where the light receiving surface of the image pick-up sensor 8 is coincide with a lens back position, with an upward movement of the quick return mirror M1. And the image pick-up unit 19 moves backward in the direction of the optical axis to a standby position where the image pick-up sensor 8 does not cause a mechanical interference with the quick return mirror M1, with a downward movement of the quick return mirror M1 to an original position after taking an image.

The driver 30 may have a known driving mechanism such as a driving mechanism for converting a rotational movement of a bolt rotated by a motor into a linear movement.

Above the quick return mirror M1, a finder unit 9, which corresponds to a finder of a silver halide camera, is provided. The finder unit 9 is equipped with a focussing screen 10 and a penta-shape prism 11. Behind the prism 11, a relay lens 12 is provided. Behind the relay lens 12, an ocular 13 is equipped. Above the relay lens 12, a light sensor 14 is provided. In FIGS. 2A–2D, the relay lens 12 is not illustrated.

Figure 2A:
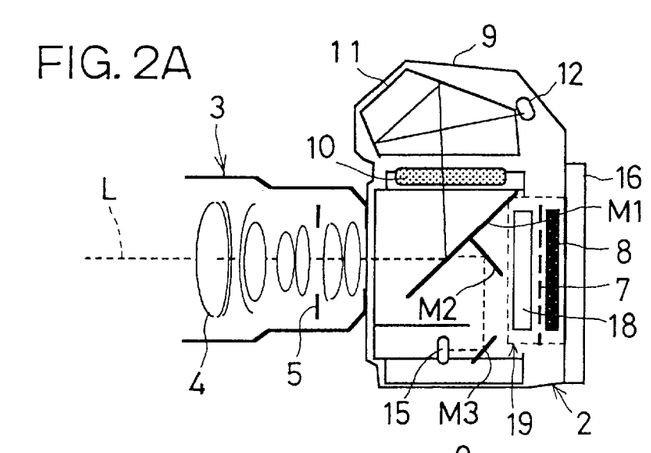
FIGS. 2A to 2D illustrate an operation of the main mechanical portion of the digital camera when taking an image.
Figure 2B:
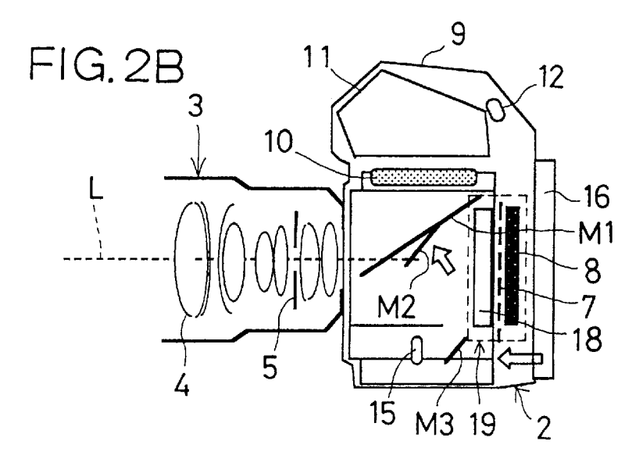
Figure 2C:
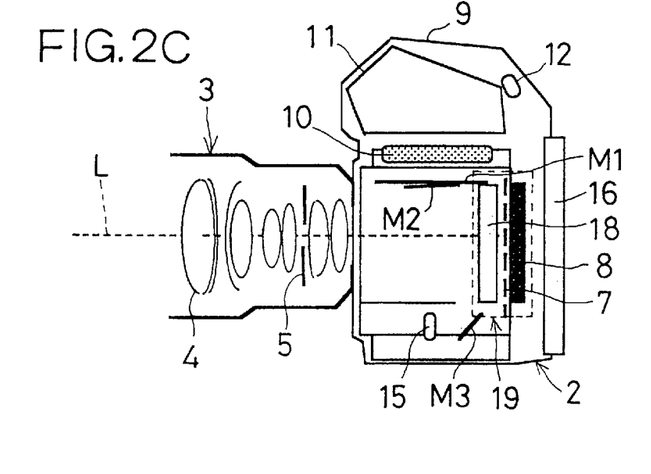
Figure 2D:
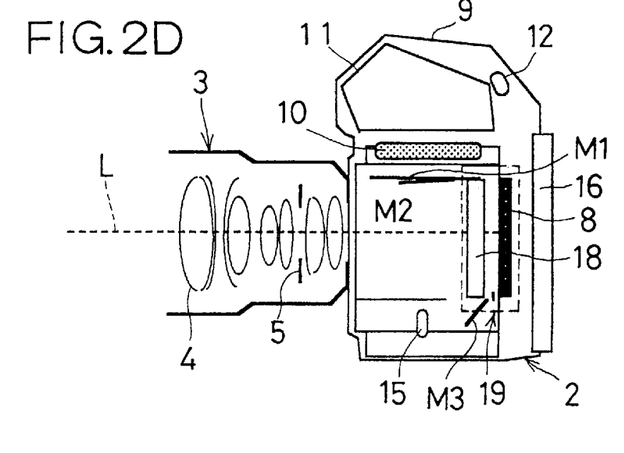

As shown in FIGS. 1 and 2A, the quick return mirror M1 keeps its original position slanted by 45 degrees relative to the optical axis until a shutter button (not shown) is fully depressed. In this state, the optical path L is changed its direction toward the focussing screen 10. When the shutter button is fully depressed, as shown in FIGS. 2B–2D, the quick return mirror M1 rotates upwardly about the pivoting portion 6 to a generally horizontal position to open the optical path L from the lens unit 4.

The quick return mirror M1 is integrally provided with a mirror M2. The mirror M2 reflexes an optical image, passed through a half mirror portion partially provided in the quick return mirror M1, toward a distance measuring sensor 15 by way of a fixed mirror M3 provided below the mirror M2. The distance measuring sensor 15 receives the optical image to detect the distance from the object to the digital camera 1 for automatically focussing the lens unit 4.

The prism 11 reverses and reduces the optical image focussed on the focussing screen 10, and then transmits the image to the light sensor 14 and the ocular 13. Based on the light amount data obtained by the light sensor 14, each control amount for the diaphragm, the shutter speed and the exposure amount of the image pick-up sensor 8, are determined.

On the back surface of the camera main body 2, a display portion 16 made of a liquid crystal display is provided for displaying an image obtained based on an output of the image pick-up sensor 8.

Figure 3:
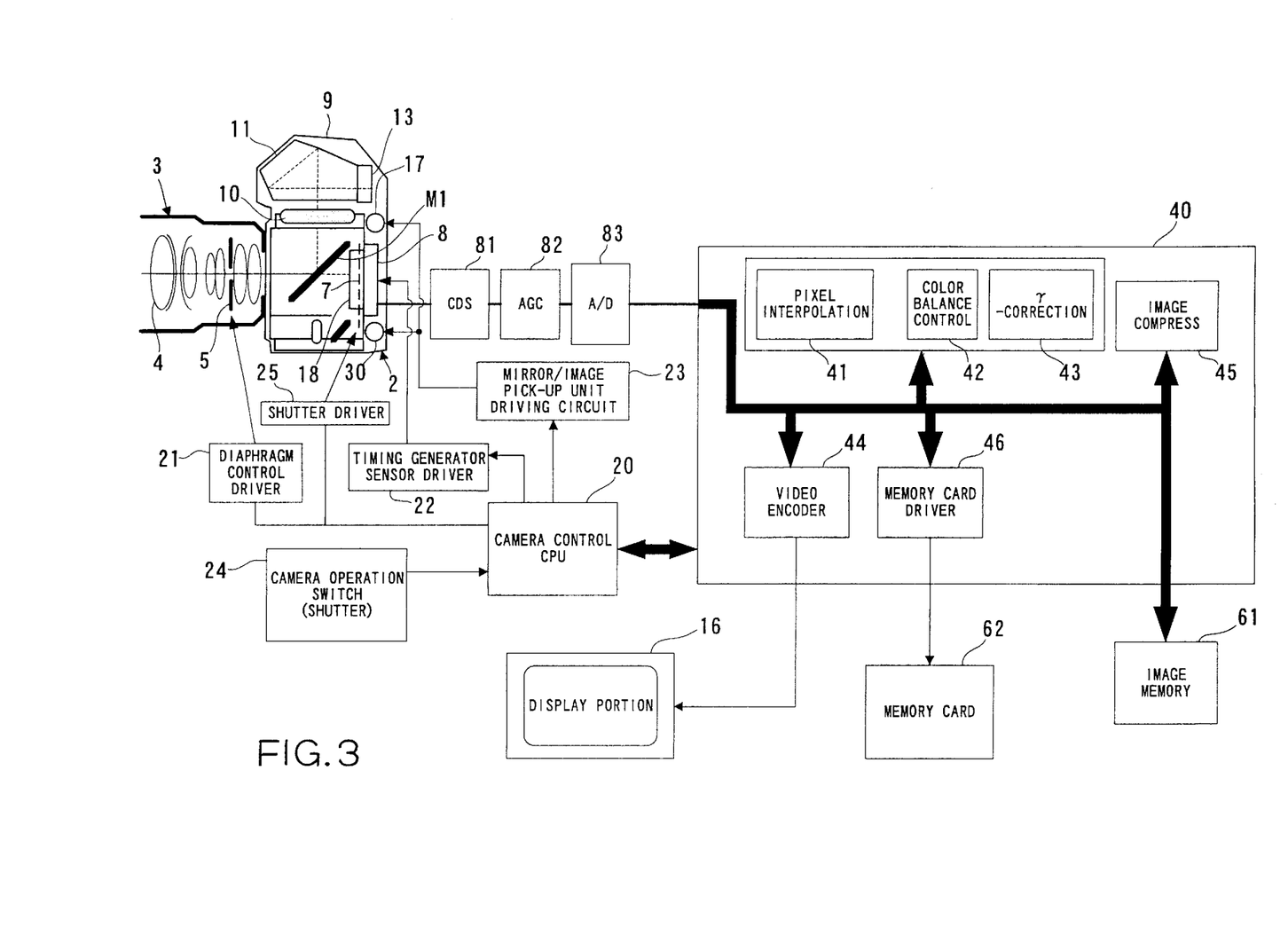
FIG. 3 is a block diagram showing a control system of the digital camera shown in FIGS. 1 and 2.

FIG. 3 shows a block diagram showing a control system used in the digital camera 1.

In FIG. 3, the reference numerals 3, 4, 5, M1, 7, 8, 11, 13 and 16 denote the image taking lens, the lens unit, the diaphragm, the quick return mirror, the focal plane shutter, the image pick-up sensor, the prism, the ocular and the display, respectively, the same as in FIGS. 1 and 2.

The reference numeral 20 denotes a camera control CPU for controlling each component of the camera main body 2. In detail, the diaphragm 5 is controlled by the camera control CPU 20 by way of the diaphragm control driver 21, and the image pick-up sensor 8 is controlled by the camera control CPU 20 by way of a timing generator sensor driver 22. The actuator 17 for actuating the quick return mirror M1 and the driver 30 for driving the image pick-up unit 19 are controlled by the camera control CPU 20 by way of a mirror/image pick-up unit driving circuit 23, and the focal plane shutter 7 is also controlled by the camera control CPU 20 by way of a shutter driver 25.

Connected to the camera control CPU 20 is a camera operation switch 24.

The image pick-up sensor 8 is made of a charged coupled device (i.e., CCD) in this embodiment. The image pick-up sensor 8 is an area sensor, on each pixel of which being covered by a primary colors transmission filter of R(red), G(green) and B(blue) in a check pattern. The image pick-up sensor 8 photoelectrically converts the R, G and B components of the optical image of the object focussed by the lens unit 4 into the corresponding R, G and B image components, each of which consists of a sequence of pixel signals received by the pixels, and outputs them.

The timing generator sensor driver 22 generates and outputs driving control signals for the image pick-up sensor 8, based on a reference clock transmitted from the camera control CPU 20. To be more precise, the timing generator sensor driver 22 generates, for example, a timing signal for determining the start and termination of the integration(or exposure), and clock signals (i.e., a horizontal synchronization signal, a vertical synchronization signal, a transfer signal, etc.) for controlling the read out timings of the signals from the pixels. These timing signals and clock signals are supplied to the image pick-up sensor 8 by way of the timing generator sensor driver 22.

The output of the image pick-up sensor 8 is subjected to a signal processing by a CDS (Correlated Double Sampling) circuit 81, which decreases the noises of the image signals, and an AGC (Automatic Gain Control) circuit 82, which adjusts the levels of the image signals. The A/D converter 83 converts the analogue image signals normalized by the AGC circuit 82 into a 10-bit digital signal.

The reference numeral 40 is an image processing unit for forming an image file by processing an output of the A/D converter 83. The image processing unit 40 is controlled by the camera control CPU 20.

When taking an image, the image data obtained from the image pick-up sensor 8 is transmitted to the image processing unit 40 for subjecting to various processing. The signals inputted into the image processing unit 40 from the A/D converter 83 are written in the image memory 61 in synchronous with the read out of the signals from the image pick-up sensor 8. Thereafter, the process shown in each block is executed while accessing the data in the image memory 61.

In the image processing unit 40, the reference numeral 41 denotes a pixel interpolation block in which a pixel interpolation is performed at a certain interpolation pattern. According to this embodiment, each pixel of components R, G, B is subjected to a masking processing in accordance with a respective filter pattern. Thereafter, as for the component G having a pixel until a high frequency, the intermediate two values among the peripheral four pixels are converted into an average value by a median filter. As for the components R, B, they are subjected to an average interpolation processing to obtain each output.

The color balance control block 42 individually performs a gain correction of each output of R, G, B each interpolated by the above pixel interpolation block 41, so that the color corrections of R, G, B are performed. As for the color balance, against each average value of R, G, B, the camera control CPU 20 calculates the value of R/G and B/G as a correction gain of R, G, respectively.

The gamma correction block 43 performs a nonlinear transformation of the R, G and B outputs, the color balance of the outputs being normalized, for a tone transformation appropriate to the display portion 16. The gamma-corrected image data is stored in the image memory 61.

The video encoder 44 reads out the above data stored in the image memory 61 to encode into NTSC/PAL, and the encoded data is displayed on the display portion 16.

The image compress block 45 reads out the image data of the image obtained by the image pick-up sensor 8 from the image memory 61 for subjecting to a compressing processing. After the compression, the compressed image is recorded in the memory card 62 via the memory card driver 46.

The memory card 62 is detachably attached to a certain portion of the camera main body 2.

The operation of the digital camera shown in FIGS. 1 through 3 will be explained as follows.

When the shutter button is half depressed, as shown in FIG. 2A, the light passed through the lens unit 4 and the diaphragm 5 is reflexed by the quick return mirror M1 positioned in the camera main body 2 so as to change the light path L upward, and the image is focussed on the focussing screen 10. Thereafter, the image is reversed and reduced by the penta-type prism 11 and inputted into the light sensor 14. The light sensor 14 measures the light amount. Based on the light amount, the camera control CPU 20 calculates an exposure control data. Based on the calculated exposure control data, the diaphragm 5 is controlled by the diaphragm driver 21 so that the exposure amount to the image pick-up sensor 8 becomes appropriate. And the timing generator sensor driver 22, which supplies drive control signals to the image pick-up sensor 8, is also controlled.

At this time, the image pick-up unit 19 is located at the rear standby position so as to avoid a mechanical interference with the quick return mirror M1. Thus, the light receiving surface of the image pick-up sensor 8 is located behind the lens back position.

A part of the light passed through the lens unit 4 and the diaphragm 5 is transmitted through the quick return mirror M1, and advances toward the distance measuring sensor 15 by way of the mirror M2 and the fixed mirror M3. The distance measuring sensor 15 receives the light, and detects the distance from the digital camera 1 to the object. Based on the detected distance, the lens unit 4 is focussed automatically.

At the same time of the measurements of the light amount and the distance, the optical image changed its optical path L by the quick return mirror M1 is reduced and reversed by the prism 11 and relay lens 12, and then arrives at the ocular 13. Thus, the user can confirm the object through the ocular 13.

Fully depressing the shutter button causes the diaphragm to shut to a certain degree, and causes the quick return mirror M1 to rotate upward about the pivoting portion 6, as shown by a white block arrow in FIG. 2B. In accordance with the above, the image pick-up unit 19 moves forward in the optical direction of the lens unit 4 by the driver 30. In FIG. 2, the actuator 17 for driving the quick return mirror M1 and the driver 30 for moving the image pick-up unit 19 are omitted.

As shown in FIG. 2C, when the upward rotational movement of the quick return mirror M1 is completed by arriving to the lower surface of the focussing screen 10, the forward movement of the image pick-up unit 19 is also completed, whereby the light receiving surface of the image pick-up sensor 8 is set to the lens back position. Then, as shown in FIG. 2D, the focal plane shutter 7 is opened and closed at a certain speed, whereby the optical image passed through the lens unit 4 and the diaphragm 5 is focussed onto the image pick-up sensor 8 as it is, and is photoelectrically converted into an electrical signal. The photoelectrically converted signal is outputted via a buffer.

After taking an image, the quick return mirror M1 returns to the original position to cause the optical path L toward the focussing screen 10, resulting in an image taking standby state. In accordance with the returning movement of the quick return mirror M1, the image pick-up unit 19 moves backward in the direction of the optical axis to the standby position to avoid the mechanical interference with the returning quick return mirror M1.

The image data outputted from the image pick-up sensor 8 is subjected to a certain signal processing by the CDS circuit 81, the AGC circuit 82 and the A/D converter 83. The processed image data is then inputted into the image processing unit 40, and is also written in the image memory 61 in synchronism with the read out of the image pick-up sensor 8.

At the image processing unit 40, the image data written in the image memory 61 is subjected to the image pixel interpolation processing, the color balance control, and the gamma correction processing. The processed image data is again stored in the image memory 61, and read out from the image memory 61 to be displayed on the display portion 16. At the same time, the image data is compressed at the image compress block 45, and then stored in the memory card 62.

With the digital camera according to the first embodiment, since the image pick-up unit 19 moves between the forward image taking position and the rear standby position in accordance with the pivotal movement of the quick return mirror M1, an interference between the quick return mirror M1 and the image pick-up unit 19 can be avoided. Thus, a damage of the quick return mirror M1 can be prevented, and an appropriate image without out-of-focus can be obtained.

Furthermore, since it is not required to install a low pass filter at the lens mounting portion or around thereof, a wide lens or any other lens for use in a conventional silver-halide single-lens reflex camera can be used.

Figure 4:
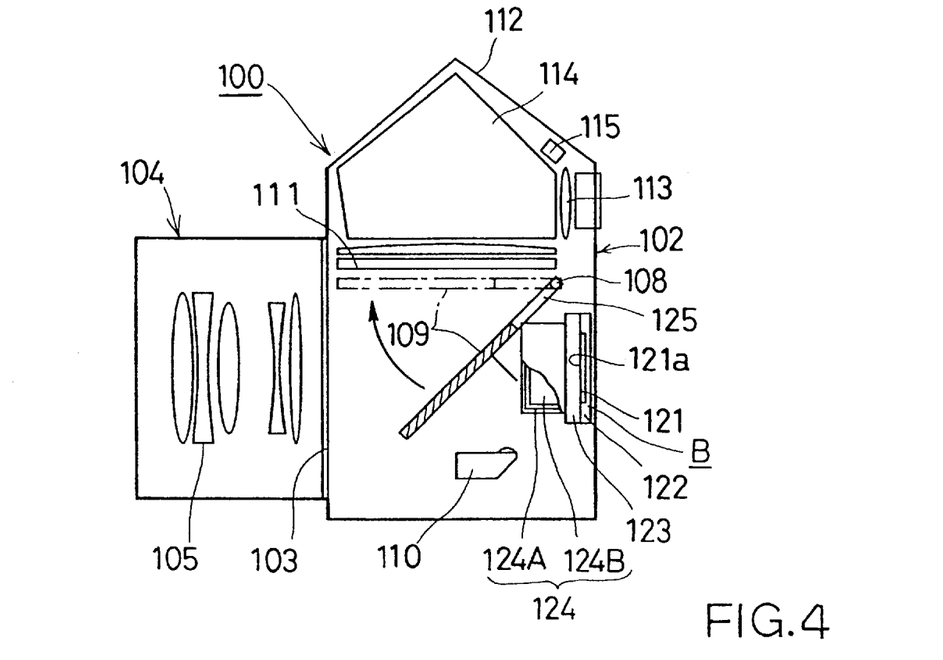
FIG. 4 a schematic cross-sectional side view of a digital camera according to a second embodiment of the present invention.
Figure 5:
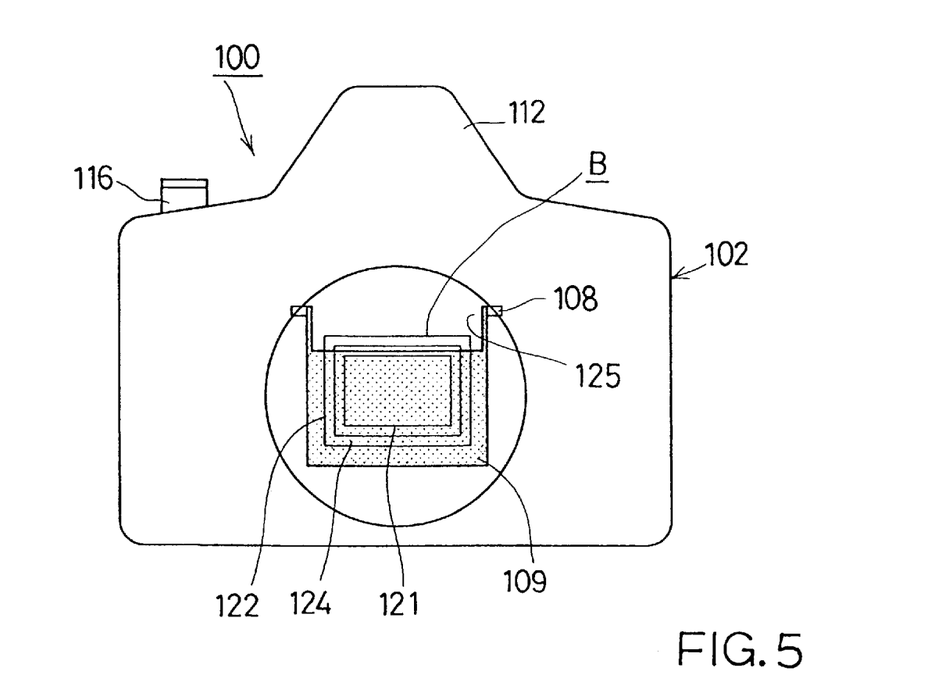
FIG. 5 is a schematic front view of the digital camera shown in FIG. 4.

FIGS. 4 and 5 illustrate a second embodiment of the present invention.

This digital camera 100 is comprised of a box-shape camera main body 102 and an interchangeable image taking lens 104 detachably attached to a front surface of the camera main body 102 by way of a mounting portion 103.

The camera main body 102 is a conventional camera main body for use in a silver halide single-lens reflex camera. In detail, in the camera main body 102, a quick return mirror 109 pivotable by way of a pivot shaft 108 in the direction of up-and-down is provided in front of the film position. Also provided in the camera main body 102 is an AF (automatic focussing) sensor 110 which receives an optical image of an object passed through the lens unit 105 of the image taking lens 104 to detect the focal status.

Above the quick return mirror M1, a focussing screen 111 is provided. Furthermore, provided above the camera main body 102 is a penta-shaped finder 112 in which a penta-prism 114 is installed for forwarding the optical image of the object focussed on the focussing screen 111 toward an ocular 113. In the finder 112, a light sensor 115 and the like are installed.

As shown in FIG. 4, in the camera main body 102, a CCD 121 as an image pick-up element is installed on the optical axis of the lens unit 5 such that the light receiving surface 121a of the CCD 121 is located at a portion where an image focussing surface of a silver halide film is to be positioned. The CCD 121 is attached on a main surface (the image taking lens 104 side surface) of a circuit board 122. The surface of the CCD 121 is covered by a protection glass layer 123. On the surface of the glass layer 122, a filter portion 124 having an outer layer as an infrared cutting filter 124A and an inner layer as a low pass filter 124B is coaxially fixed. The CCD 121, the circuit board 122, the protection glass layer 123 and the filter portion 124 constitute an image pick-up unit B.

Therefore, the image pick-up unit B has a structure such that the filter portion 124 protrudes from the CCD 121 forward, or toward the quick return mirror 109. If this mechanical structure is used as it is, the upper front portion of the image pick-up unit B will mechanically interfere with an upper portion (a portion near the pivot shaft 108) of the quick return mirror 109.

Accordingly, in this embodiment, as shown in FIG. 5, a dented space 125 extending in a generally full width of the quick return mirror 109 is formed at the upper portion (a portion near the pivot shaft 108) of the quick return mirror 109.

In the meantime, the quick return mirror 109 of a conventional silver halide single-lens reflex camera is designed to have such a size that the whole optical image of the object can be reflexed toward the image focussing surface of a silver halide film. To the contrary, in this embodiment, the area of the light receiving surface of the CCD 121 is set to be smaller than that of the image focussing surface of a silver halide film. Therefore, the quick return mirror 109 of this digital camera 100 may be smaller than that of the silver halide single-lens reflex camera. Accordingly, the above mentioned problem concerning the interference can be solved by cutting out the upper portion (a portion near the pivot shaft 108) of the quick return mirror 109 to form the dented space 125 so that an optical image required by the CCD 121 can be obtained.

As of the other portion, i.e., a portion other than the pivot shaft side of the quick return mirror 109, it is not required to cut off because a mechanical interference does not occur at the other portion.

Next, the operation of the digital camera shown in FIGS. 4 and 5 will be explained as follows.

Attaching the image taking lens 104 to the camera main body 102 by way of the mounting portion 103 by the user enables a signal exchange between a micro computer equipped in the camera main body 102 (hereinafter referred to as "a camera side micro computer") and a micro computer equipped in the image taking lens 104 (hereinafter referred to as "a lens side micro computer"). In addition, it becomes possible to transmit the information on the image taking lens 104 to the camera main body 102.

The optical image of the object passed through the lens unit 105 is reflexed by the quick return mirror 109, which usually takes a reflex position slanted by 45 degrees to the optical axis, to be focussed onto the focussing screen 111. The optical position of the focussing screen 111 is equivalent to the light receiving surface 121a of the image pick-up element 121, whereby the focussed state on the light receiving surface 121a is reproduced on the focussing screen 111. Since the reproduced image is forwarded to the ocular 113 via the penta-prism 114, the user can confirm the reproduced image through the ocular 113.

An operation of the power switch (not shown) of the camera main body 102 by the user activates the camera side micro computer, thus the micro computer is initialized. Thereafter, the camera side micro computer receives information on lens from the lens side micro computer, and then transmits an initial drive command to the lens side micro computer to drive the lens unit and/or the diaphragm.

Thereafter, the camera side micro computer keeps watch on a half depress operation of the shutter button 116 (hereinafter referred to as "S1 operation") by the user. When the user performs S1 operation, the camera side micro computer detects the operation to control the AF sensor 110 and calculate the output data for detecting the focussing status on the light receiving surface 121a. Based on the result, the camera side micro computer calculates the driving direction and amount of the image taking lens 104 for causing a focussing status of the optical image of the object, and transmits the calculated results to the lens side micro computer. The sequence of the operations will be repeatedly continued until the optical image is focussed unless the S1 operation is released.

When the optical image is focussed, the camera side micro computer stops the sequence of the operations. At the same time, the camera side micro computer controls the light sensor 115 to detect the luminance of the object, and calculates the luminance data to obtain a shutter speed and a diaphragm value for an appropriate exposure to the CCD 121.

Thereafter, the camera side micro computer keeps watch on a full depress operation of the shutter button 116 (hereinafter referred to as "S2 operation") by the user. When the user performs the S2 operation, the camera side micro computer detects the operation to transmit a command to the lens side micro computer so as to shut the diaphragm to the calculated value. Then, the lens side micro computer received the command controls the diaphragm.

At the same time, the camera side micro computer rotates the quick return mirror 109 to the horizontal position (the position illustrated by a dashed line) near the focussing screen 111. Thus, the optical image is not obstructed by the quick return mirror 109, and advances toward the CCD 121 to be focussed on the light receiving surface 121a.

After the exposure, the camera side micro computer returns the quick return mirror 109 to the original position. However, as mentioned above, since the quick return mirror 109 has a dented space 125 at the pivot shaft side thereof, the quick return mirror 109 will not interfere with the image pick-up unit B even if the mirror 109 returned to the original position.

Figure 6:
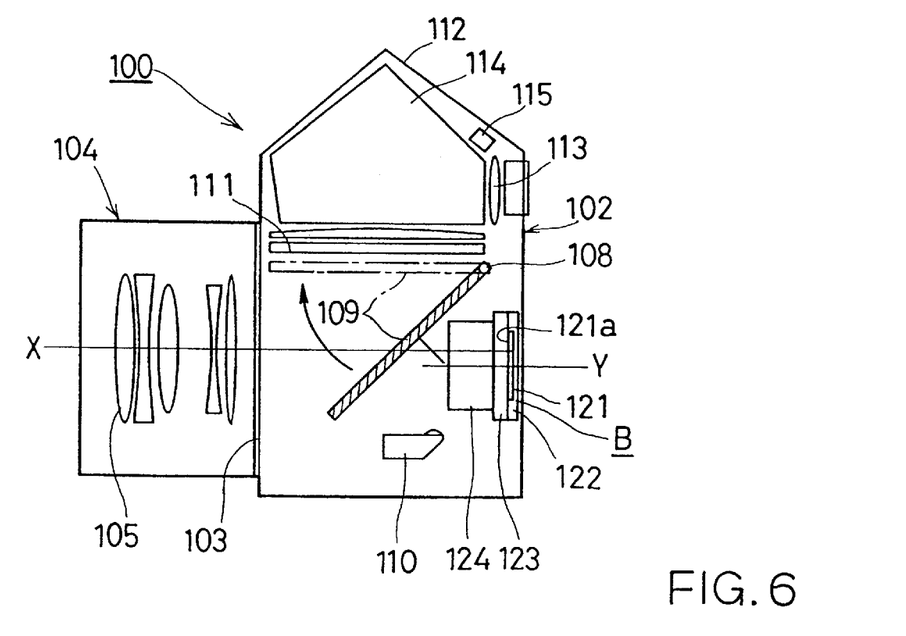
FIG. 6 is a schematic cross-sectional side view of a digital camera according to a third embodiment of the present invention.
Figure 7:
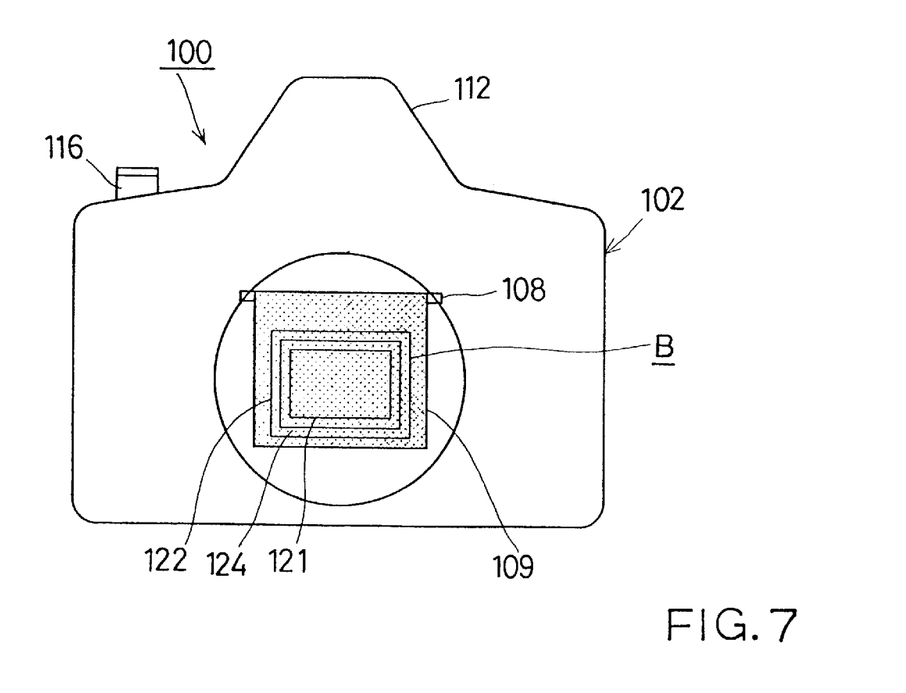
FIG. 7 is a schematic front view of the digital camera shown in FIG. 6.

Next, a third embodiment according to the present invention will be explained with reference to FIGS. 6 and 7. In FIGS. 6 and 7, the same construction as in the second embodiment will be allotted to the same reference numerals.

In FIGS. 6 and 7, the effective light receiving surface (image circle) of the CCD 121 is designed so as to satisfy the photographing flame of a conventional silver halide camera. Provided that the light receiving surface 121a is located within the photographing flame, even if the light receiving surface 121a is located at any desired position, there will be no problem. Therefore, it is not required that the center of the light receiving surface is coincide with the optical axis X of the lens unit 105.

In this embodiment, the image pick-up unit B is shifted such that the center (the center axis is shown as Y) of the light receiving surface 121a of the CCD 121 is located lower than the optical axis X so as to be away from the pivot shaft 108. Since the quick return mirror 109 normally takes a slanted position with the free end (lower end) located near the image taking lens 104, the gap between the quick return mirror 109 and the image pick-up unit B becomes larger as it is away from the pivot shaft 108. Therefore, by shifting the center of the light receiving surface 121a of the CCD 121 so as to be away from the pivot shaft 108 of the quick return mirror 109 with regard to the optical axis X of the image taking lens 104, the image pick-up unit B moves toward the larger gap. Thus, the mechanical interference between the quick return mirror 109 and the image pick-up unit B can be avoided.

In the second and the third embodiment, forming the dented space 125 of the quick return mirror 109 and the shifted position of the image pick-up unit B are separately employed. However, it is possible to employ both the dented space and the shifted position depending on the interference degree. Furthermore, the dented space 125 is not limited to be formed at the pivot shaft side of the quick return mirror 109, but may be formed at a portion adjacent to the pivot shaft 108 so as to partially avoid the interference with the image pick-up unit B.

With the digital camera according to the second and third embodiments, a mechanical interference between the quick return mirror and the image pick-up unit can be avoided by forming a dented space at the pivot shaft side of the quick return mirror or shifting the image pick-up unit against the optical axis of the image taking lens.

Furthermore, the mechanical interference can be easily avoided by simply forming a space in a quick return mirror or changing the position of the image pick-up unit, not by deleting the quick return mirror or changing the position thereof. Thus, it is possible to make the maximum use of the resources of a conventional silver halide camera.

Furthermore, since it is not required to reduce the thickness of the filter of the image pick-up unit or the like, it is possible to prevent the deteriorate of the filter function and the image quality.

The terms and descriptions in this specification are used only for the explanatory purposes, and the present invention is not limited to these terms and descriptions. It should be appreciated that there are many modifications and substitutions without departing from the spirit and the scope of the invention which is defined by the appended claims.

What is claimed is:

1. An image taking apparatus, comprising:
   an image taking lens;
   a mirror which is capable of a pivotal movement such that said mirror changes a position thereof between a first position where said mirror is disposed on an optical path of said image taking lens and a second position where said mirror is disposed off the optical path;
   an image pick-up unit for picking up an optical image taken by said image taking lens; and
   a driver for moving said image pick-up unit along a direction of an optical axis of said image taking lens in accordance with the pivotal movement of said mirror.

2. The image taking apparatus according to claim 1, wherein said driver moves said image pick-up unit to a standby position when said mirror is disposed on the optical path and moves said image pick-up unit to an image pick-up position when said mirror is disposed off the optical path.

3. The image taking apparatus according to claim 1, wherein said image pick-up unit comprises an optical filter and an image pick-up element for photoelectrically converting an optical image taken by said image taking lens.

4. An image taking apparatus, comprising:
   an image taking lens;
   a mirror for changing a direction of an optical bundle introduced from said image taking lens by pivoting said mirror about a pivot axis member; and
   an image pick-up unit for picking up an optical image taken by said image taking lens,
   wherein said mirror is provided with a space for avoiding a mechanical interference with said image pick-up unit.

5. The image taking apparatus according to claim 4, wherein said space is formed at a portion near said pivot axis member.

6. The image taking apparatus according to claim 4, wherein said image pick-up unit comprises an optical filter and an image pick-up element for photoelectrically converting an optical image taken by said image taking lens.

7. An image taking apparatus, comprising:
   an image taking lens;
   a mirror for changing a direction of an optical bundle from said image taking lens by pivoting about a pivot axis member; and
   an image pick-up unit for picking up an optical image taken by said image taking lens,
   wherein said image pick-up unit is disposed so as to be shifted to an optical axis of said image taking lens in accordance with the pivoting of the mirror.

8. The image taking apparatus according to claim 7, wherein said image pick-up unit comprises an optical filter and an image pick-up element for photoelectrically converting an optical image obtained from said image taking lens.

9. The image taking apparatus according to claim 8, wherein a center of an optical receiving surface of said image pick-up element is positioned so as to be shifted in a direction away from said pivot axis member.

10. An image taking apparatus, comprising:
    an image taking lens;
    a mirror for changing a direction of a beam of light from said image taking lens by pivoting about a pivot axis member; and
    an image pick-up unit for picking up an optical image taken by said image taking lens,
    wherein said image pick-up unit is disposed so as to be shifted to an optical axis of said image taking lens in accordance with the pivoting of the mirror.

* * * * *